United States Patent [19]

Ebara et al.

[11] Patent Number: 5,130,858
[45] Date of Patent: Jul. 14, 1992

[54] APPARATUS HAVING A FIELD MEMORY FOR REPRODUCING VIDEO SIGNALS

[75] Inventors: Masami Ebara, Osaka; Yasuo Onishi, Daito; Yukio Sugimura, Suita; Shinya Okuno, Takatsuki, all of Japan

[73] Assignee: Sanyo Electric Co., Ltd., Moriguchi, Japan

[21] Appl. No.: 614,572

[22] Filed: Nov. 16, 1990

Related U.S. Application Data

[63] Continuation of Ser. No. 195,935, May 19, 1988, abandoned.

[30] Foreign Application Priority Data

| May 20, 1987 | [JP] | Japan | 62-124434 |
| May 20, 1987 | [JP] | Japan | 62-124435 |

[51] Int. Cl.$^5$ .............................................. H04N 5/783
[52] U.S. Cl. .................................. 360/10.3; 360/10.1; 360/36.2; 358/339; 358/342
[58] Field of Search ............... 360/10.1, 11.1, 36.2, 360/38.1, 10.3; 358/312, 339, 342

[56] References Cited

U.S. PATENT DOCUMENTS

| 4,027,333 | 5/1977 | Kaiser et al. | 360/11.1 X |
| 4,178,607 | 12/1979 | Mikado . | |
| 4,247,865 | 1/1981 | Mastronardi | 358/312 |
| 4,329,708 | 5/1982 | Yamamoto et al. | 360/38.1 X |
| 4,477,843 | 10/1984 | Kinjo et al. | 360/10.1 X |
| 4,698,698 | 10/1987 | Collins | 360/10.1 |
| 4,733,312 | 3/1988 | Morimoto | 360/10.1 |
| 4,788,604 | 11/1988 | Takeuchi | 360/36.2 X |
| 4,800,445 | 1/1989 | Kanda | 358/312 X |
| 4,858,030 | 8/1989 | Oku et al. | 358/312 X |
| 4,873,587 | 10/1989 | Yoshimura et al. | 360/10.1 X |

FOREIGN PATENT DOCUMENTS

| 2603149 | 2/1988 | France . | |
| 58-139577 | 8/1983 | Japan . | |
| 60-193152 | 1/1985 | Japan | 358/312 |

OTHER PUBLICATIONS

Publication by "TV Gijutsu", Jan. 1987, pp. 96–100.

*Primary Examiner*—Roy N. Envall, Jr.
*Assistant Examiner*—W. R. Young
*Attorney, Agent, or Firm*—Armstrong, Nikaido, Marmelstein, Kubovcik & Murray

[57] ABSTRACT

A video signal reproducing apparatus, such as a video disc player, equipped with a field memory for special reproduction such as still-picture reproduction. The video signal writing-reading period for the field memory is set to a value which is the color subcarrier period multiplied by an integer, is also the horizontal synchronizing period multiplied by an integer and is further approximate to one field period to the greatest possible extent, to thereby eliminate the discontinuity of video signals due to the track jumping action of the pickup.

7 Claims, 7 Drawing Sheets

APPARATUS HAVING A FIELD MEMORY FOR REPRODUCING VIDEO SIGNALS

This application is a continuation of application Ser. No. 195,935 filed May 19, 1988, now abandoned.

FIELD OF THE INVENTION

The present invention relates to an apparatus for reproducing video signals from signal recording media such as video discs or magnetic tapes, and more particularly to a video signal reproducing apparatus equipped with a field memory for special reproduction such as still-picture reproduction or fast reproduction.

BACKGROUND OF THE INVENTION

With laser disc players wherein optical video discs are used as signal recording media, a laser beam spirally traces the signal recording surface of the disc from inner periphery toward outer periphery for signal reproduction. There are two kinds of optical discs for use as signal recording media in laser disc players in respect of the signal recording method: CAV (constant angular velocity) discs wherein video signals are recorded at a constant angular velocity for two fields per turn of track, and CLV (constant linear velocity) discs wherein video signals are recorded at a constant linear velocity.

With the CAV disk, video signals for one frame are recorded per revolution, and the synchronizing signals included in the video signals are arranged on a radial line. Accordingly, a still picture can be readily reproduced by causing the pickup to jump back by one turn of track toward the inner periphery of the disc every time the vertical synchronizing signal for a specified odd-numbered field is reproduced while rotating the disk at a constant speed, for example, at 1800 r.p.m.

With the CLV disc, however, synchronizing signals are recorded on a spiral track at equal spacings and are not aligned radially of the disc, so that even if the pickup is caused to jump back by one turn of track every time the vertical synchronizing signal for a particular odd-numbered field is reproduced, the specified portion of the track will not always be reproduced.

Accordingly, a video disc player has been proposed which is adapted to reproduce a still picture from the CLV disc by repeatedly causing the pickup to jump from a first position to a second position preceding the first position by approximately one frame while detecting these first and second positions so as to intermittently output the signals of one frame recorded in the track portion of second position through the first position (Unexamined Japanese Patent Publication SHO 58-139577).

However, the proposed video disc player requires a complex circuit for detecting the first and second positions. Moreover, the jumping action of the pickup for still-picture reproduction makes discontinuous the color subcarrier which is prepared based on the color burst extracted from the reproduction video signal, giving rise to the problem that a color loss occurs in the picture reproduced.

With advances in video memory techniques in recent years, on the other hand, inexpensive field memories have been developed which are capable of storing video signals for one frame. The use of such a field memory in video disc players has been investigated to realize various modes of special reproduction.

Nevertheless, with field memory application techniques heretofore known generally, the period of writing video signals in the field memory and the period of reading out the signals therefrom (hereinafter referred to as a "writing-reading period") are both set to 262.5 times the field period, i.e. one horizontal synchronization period H, so that the application of the field memory to video disc players encounters the following problem.

When video signals for one field are written in the field memory with the period of 262.5H and are thereafter repeatedly read out from the memory with the period of 262.5H, for example, for reproducing a still picture, the writing-reading period includes the fraction of 0.5H, which therefore disturbs at the junction of fields the period of horizontal synchronizing signals included in the video signals to be reproduced to produce a skew.

Figure 4A:
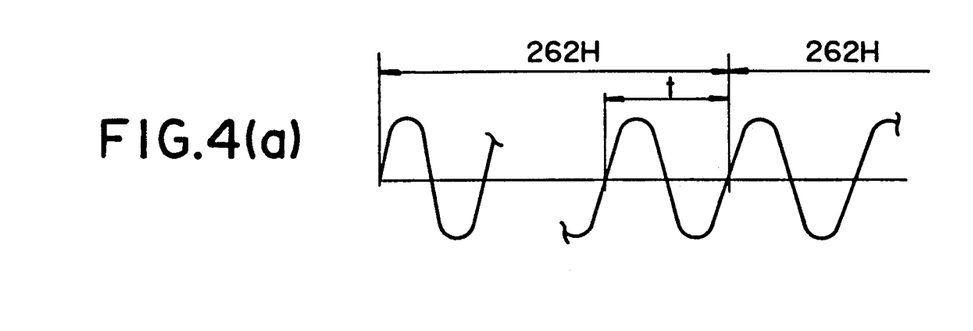
Figure 4B:
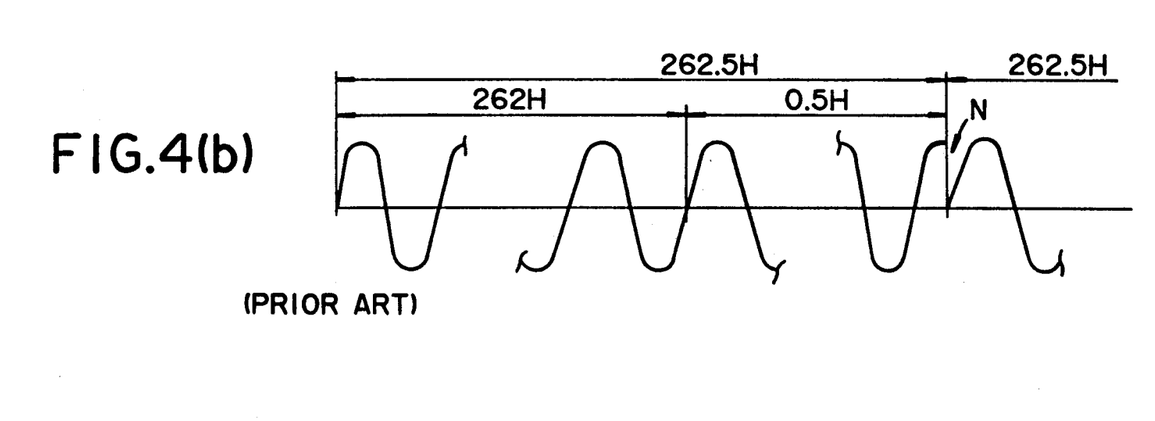

Further with reference to FIG. 4 (b), the color subcarrier corresponding to the video signals of the 1st H through the 262nd H can be stored in the field memory with respect to the entire period of each wave, but the rear portion of the last wave of color subcarrier corresponding to the video signal of the 263rd H will not be stored in the memory. Accordingly, when the video signals are repeatedly read out of the field memory, the color subcarrier becomes discontinuous at the portion indicated at N in FIG. 4 (b) to result in a loss of color.

To overcome this problem, a video disc player has been proposed which is equipped with a highly responsive servo circuit capable of absorbing a time-axis error involved in synchronizing signals due to jumping and which is adapted to detect a discontinuity occurring in the color burst to delay the output signal to the display unit based on the detection signal ("TV Gijutsu (TV Techniques)," January 1987, pp. 96-100). The video disc player, however, has the problem of necessitating a complex circuit for detecting the discontinuity of the color burst.

SUMMARY OF THE INVENTION

An object of the present invention is to provide a video signal reproducing apparatus, such as a video disc player, having a field memory with a writing-reading period which is set to an appropriately selected value other than the conventional value of 262.5H to thereby eliminate any discontinuity in the video signals for the special reproduction of images, the apparatus thus realizing the special reproduction of images with a high quality free of skew distortion, loss of color or the like.

Another object of the invention is to make it possible to repeatedly read out video signals from the field memory without any disturbance in the period of synchronizing signals included in the read-out video signals while assuring continuity of the color burst so as to realize special reproduction, such as still-picture reproduction, without a color loss or disturbance in the reproduced image.

Another object of the invention is to provide a video signal reproducing apparatus of the type described above wherein video signals can be written in and read out of the field memory with accurately the same period so that the apparatus is changeable in mode, for example, from the usual reproduction mode to still reproduction mode, without entailing any disturbance in images.

The video signal reproducing apparatus of the present invention is equipped with a field memory and is characterized in that the video signal writing-reading period T for the field memory is set to a value which is the color subcarrier period multiplied by an integer and which is also the horizontal synchronizing period multiplied by an integer, the value being approximate to the period of one field to a possible extent.

Further to preclude image disturbances upon a change of mode, the apparatus of the present invention has a writing address counter and a reading address counter which are operable based on the clock signal from a common clock signal source and which are connected at their output terminals to a memory circuit so that video signals can be written in and read out of the field memory under the control of these counters.

In accordance with a write address signal forwarded from the write address counter and with a read address signal sent from the read address counter, the memory circuit writes and reads signals both with the same period. Accordingly, the write address signal will not intersect the read address signal on the time axis to obviate the disturbance of images due to a change of mode.

BRIEF DESCRIPTION OF THE DRAWINGS

FIGS. 2 (a), (b), (c) and (d) are timing charts showing the signal writing operation of a memory circuit;

FIGS. 3 (a) and (b) are timing charts showing the signal reading operation of the memory circuit;

FIG. 4 (a) is a waveform diagram of color subcarrier of a circuit of the present invention;

FIG. 4 (b) is a waveform diagram of color subcarrier of a conventional circuit;

FIGS. 6 (a), (b), (c) and (d) are timing charts for illustrating the signal writing-reading operation of the memory circuit for slow reproduction; and FIGS. 7 (a), (b) and (c) are timing charts for illustrating the drawback of the reading operation of a conventional circuit.

DETAILED DESCRIPTION OF THE EMBODIMENT

Figure 1:
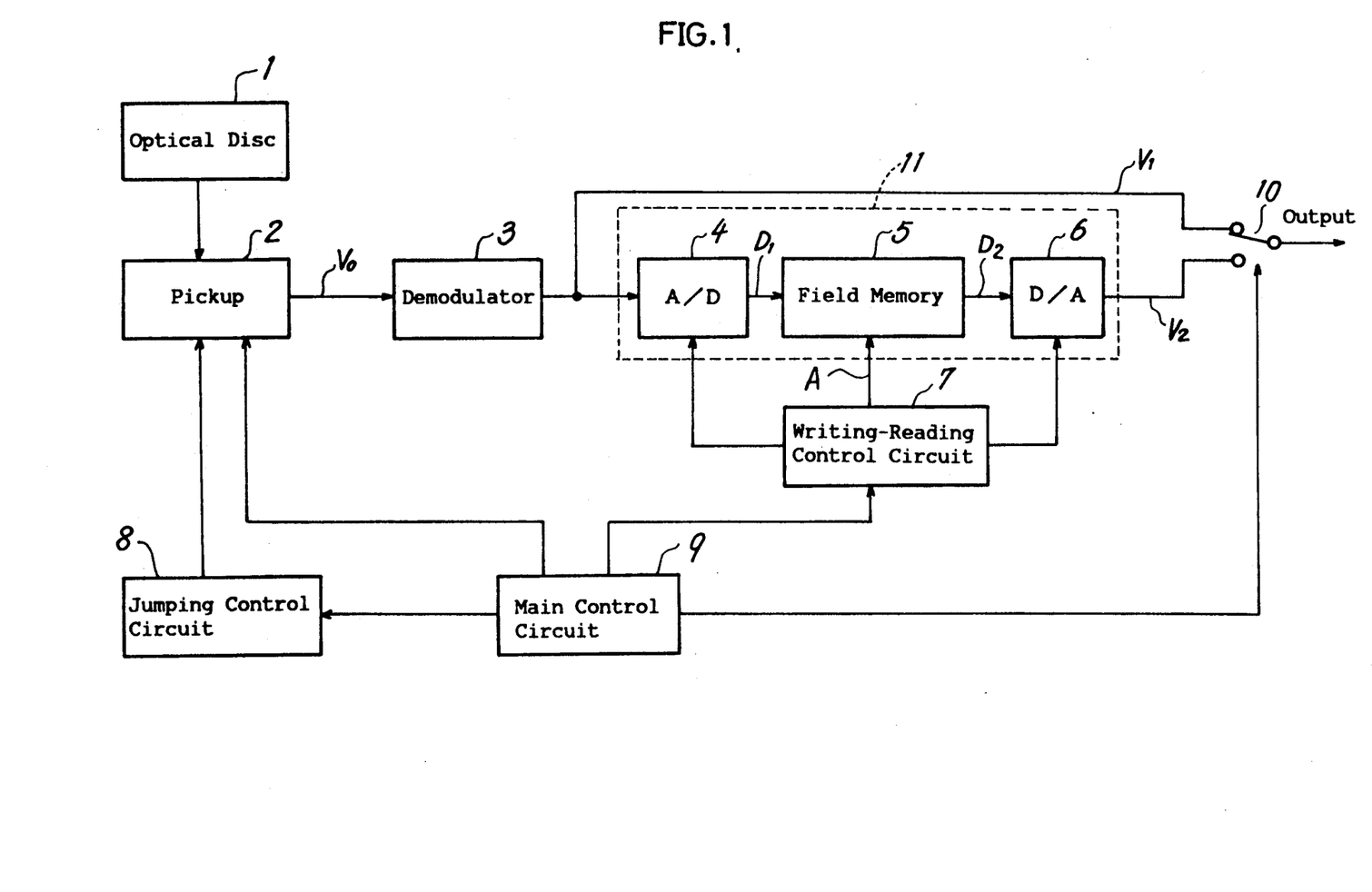
FIG. 1 is a block diagram showing the construction of a video disc player.
Figure 2A:
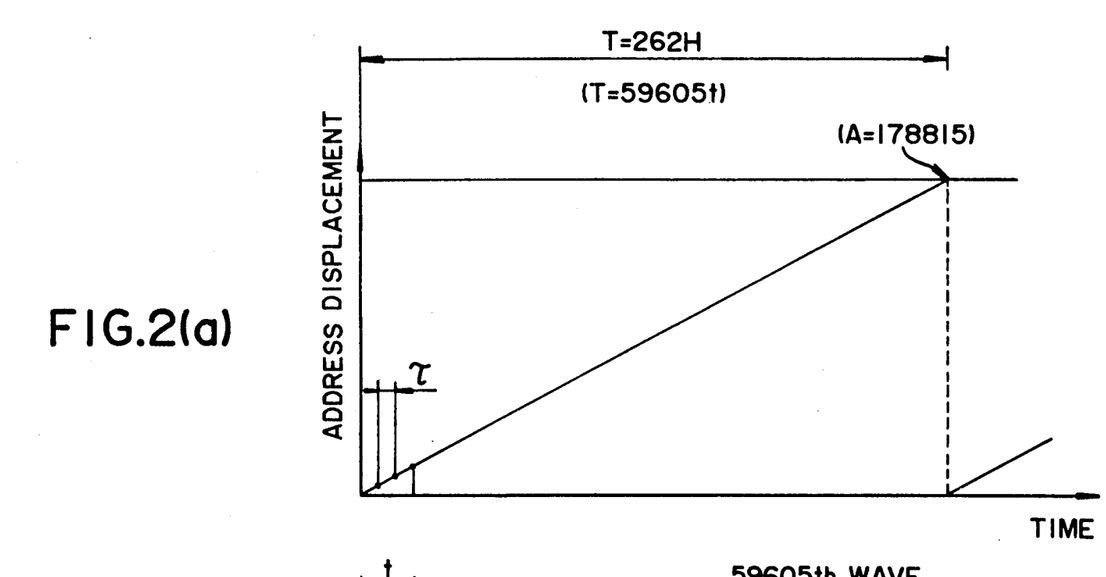
Figure 2B:
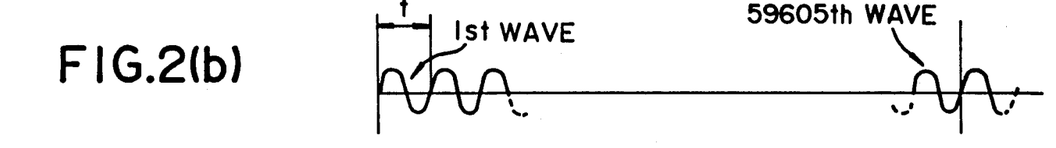
Figure 2C:
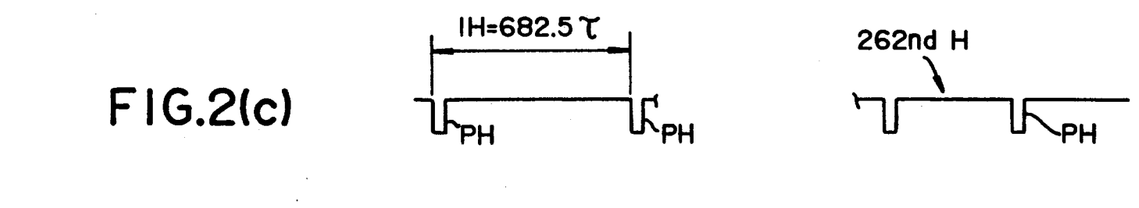
Figure 2D:
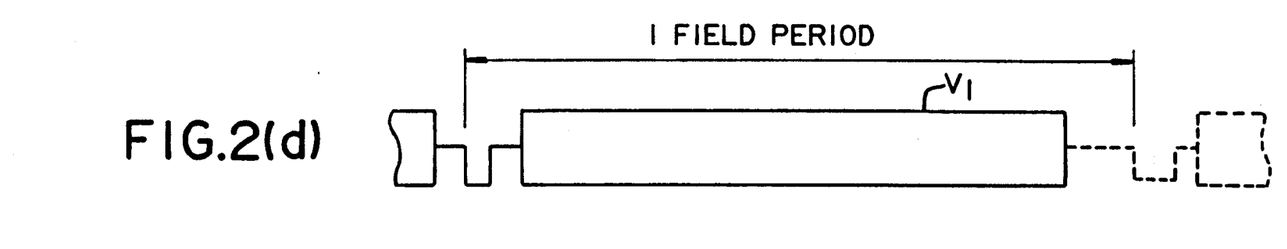

FIG. 1 shows the construction of a video disc player of the CLV type embodying the invention.

A pickup device 2 for reproducing video signals from a disc 1 comprises a pickup having an optical system and movable by pickup transport means (not shown) radially of the disc to trace the signal recording face.

The pickup device 2 has electromagnetic drive means (not shown) for jumping the pickup for special reproduction. The electromagnetic drive means comprises a magnet provided on a movable assembly including the pickup, etc., and a tracking coil provided around the movable assembly for driving the magnet in the tracking direction as already known. A jumping control circuit 8 is connected to the pickup device 2. The circuit 8 prepares jumping pulses specified in pulse width and period and feeds the pulses to the electromagnetic drive means for special reproduction.

A main control circuit 9 comprises a microcomputer for collectively controlling the operation of the video disc player.

The reproduced signal $V_0$ from the pickup device is demodulated by a demodulator circuit 3 to a composite video signal, which is then fed to a memory circuit 11 which is controlled for writing and reading by a control circuit 7.

The video signal $V_1$ produced from the demodulator circuit 3 and the video signal $V_2$ via the memory circuit 11 are applied to the respective two input terminals of a change-over switch 10 controlled by the main control circuit 9.

The switch 10 is changed over for special reproduction when both the video signals $V_1$ and $V_2$ match each other in phase and selects the output signal $V_2$ from the memory circuit 11 during jumping. At suitable time after the completion of jumping, the switch selects the output signal $V_1$ from the demodulator circuit 3. The selected signal is fed to a display.

The memory circuit 11 comprises a field memory 5, an A/D converter 4 preceding the memory and a D/A converter 6 subsequent to the memory.

The A/D converter 4 samples the output signal $V_1$ of the demodulator circuit 3, for example, at 3 times the frequency of the color subcarrier (about 3.58 MHz) to convert the signal to a digital signal $B_1$, which is written in the field memory 5 at a specified address according to an address signal A delivered from the writing-reading control circuit 7.

FIG. 2 (a) schematically shows the address displacement of the address signal. The writing-reading period T is set to a value which is 59,605 times the color subcarrier period t shown in FIG. 2 (b) and which is 262 times the horizontal synchronizing signal period H shown in FIG. 2 (c).

The writing-reading period T is set to the above value for the following reason.

First, the requirement for maintaining the continuity of the color subcarrier will be considered. As stated above, the composite video signal is sampled at a frequency F0, i.e. 3 times the frequency Fs (3.58 MHz) of the color subcarrier. Since there is the relationship of:

$$F0/Fs = 3$$

the number of repetitions of sampling, N, within one cycle period in agreement with the writing-reading period T must be 3 multiplied by an integer.

Next, the continuity of horizontal synchronizing signals will be considered. The NTSC system has the following relationship between the color subcarrier frequency Fs and the horizontal synchronization frequency Fh.

$$Fs = \frac{Fh}{2} \times 455$$

Accordingly, the number of repetitions of samplings, n, within one horizontal scanning period H is given by the following equation.

$$n = \frac{F0}{Fh} = \frac{455}{2} \times \frac{F0}{Fs} = \frac{1365}{2}$$

Thus, the horizontal synchronizing signals can be continuous when the sampling repetition number N within one cycle period is set to 1365 multiplied by an integer.

The number of repetition of sampling, M, within one field period (262.5H) is given by the following equation.

$$M = \frac{F0}{Fh} \times 262.5 = 179156.25$$

It therefore follows that when the sampling repetition number N is 3 multiplied by an integer, is also 1365 multiplied by an integer and is further an integer value which is close to 179156.25 to the greatest possible extent, both the color subcarrier and horizontal synchronizing signals can be assured of continuity, with the signal format of the NTSC system maintained generally accurately. The value of N fulfilling the above requirement is, for example, 178,815 or 180,180. When the sampling repetition number N is 178,815, the writing-reading period T is 262H. When the number N is 180,180, the period T is 264H.

When the writing-reading period T is set to 262H, address signals A for first to 178,815th address are fed from the control circuit 7 to the field memory 5, whereby video signals within one field period are written in the field memory 5 as still-picture signals as seen in FIG. 2 (d).

Figure 3A:
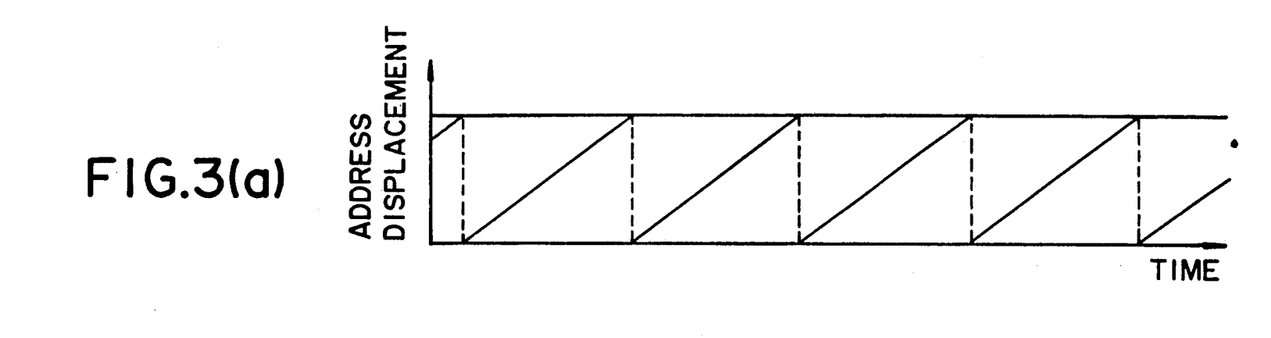
Figure 3B:
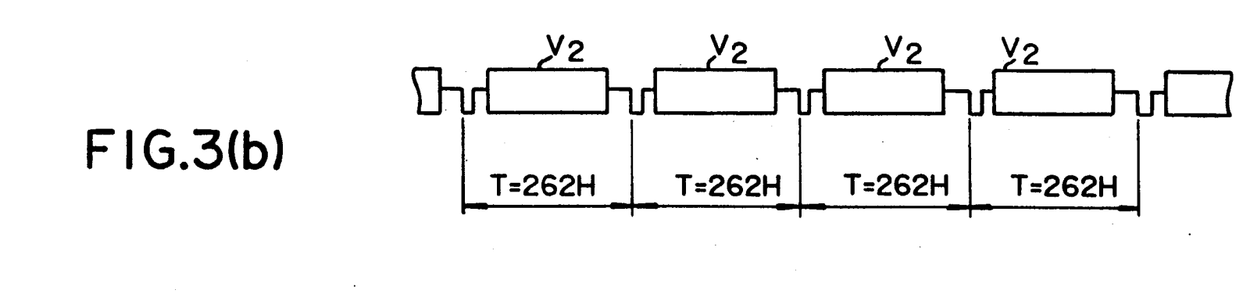

When a still picture is reproduced by repeatedly reading out the video signals $V_2$ from the field memory 5 having stored therein the video signals for approximately one field period in this ay as shown in FIGS. 3 (a) and (b), the reading period T is set to 262H.

Consequently, the horizontal synchronizing signals PH included in the composite video signals remain free of disturbance in the period at the junction of fields as seen in FIG. 2 (c) and are therefore available with a constant period H. As shown in FIGS. 2 (b) and 4 (a), moreover, the color subcarrier is available with a constant period t without becoming discontinuous at the filed junction. As a result, special reproduction can be realized without skew, color loss or the like.

The vertical synchronization period of the video signals to be delivered to the display is originally 262.5H, but this period is 262H in the above video disc player, hence an error of 0.5H. With common displays, however, normal images can be reproduced if the error is within the range of several H's as is well known, so that the above error entails no problem.

In the case of the video disc player shown in FIG. 1, the vertical synchronization period (262H) of video signals $V_2$ from the field memory 5 differs little from the vertical synchronization period (262.5H) of video signals $V_1$ from the demodulator circuit 3, so that the waiting time before the synchronizing signals of the video signals $V_1$ and $V_2$ match in phase upon the change-over of the switch 10 is greatly diminished. This results in the advantage of permitting a quick mode change.

It will be apparent that the same advantage as described above can be obtained when T is 264H.

Figure 5:
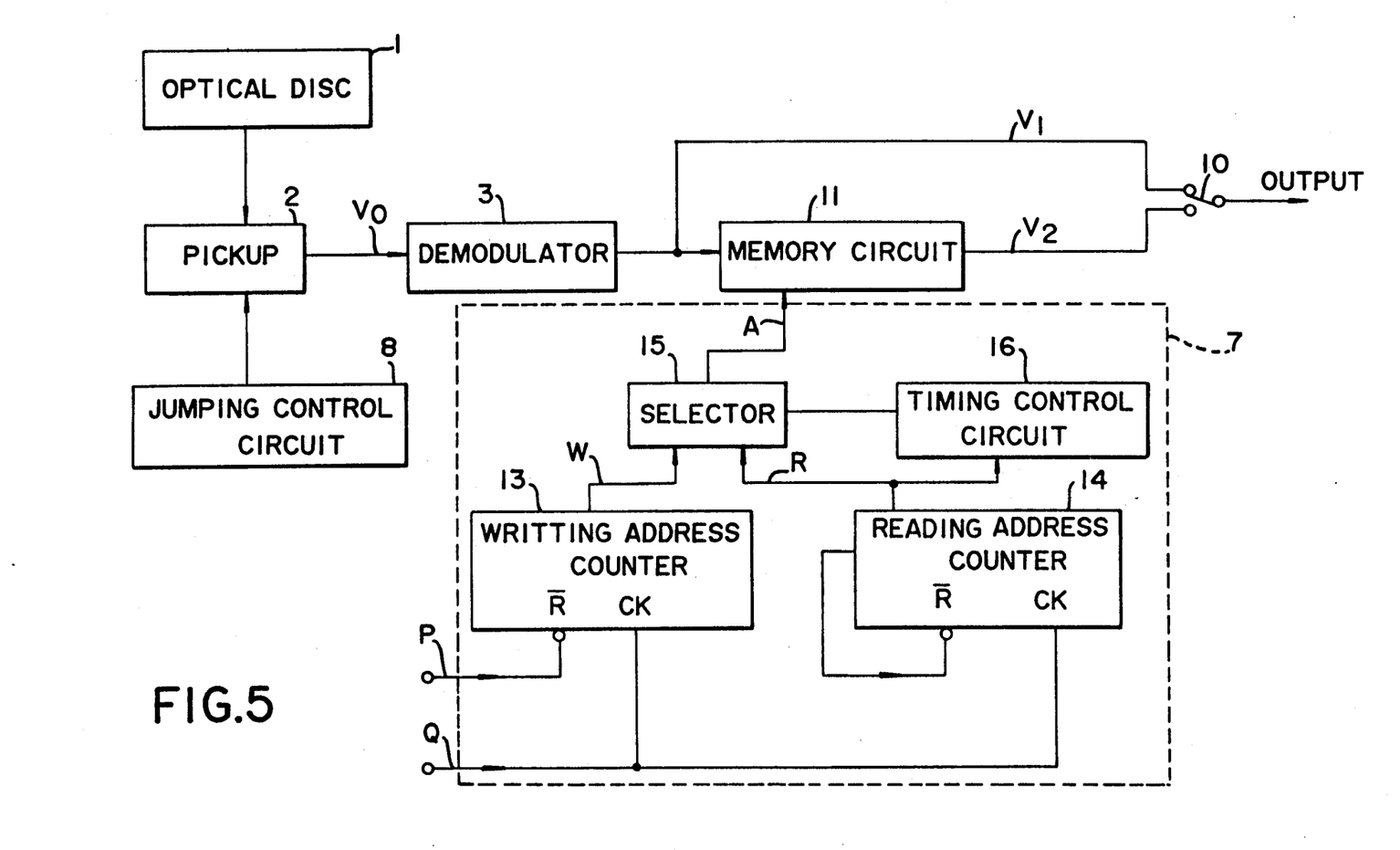
FIG. 5 is a block diagram showing the construction of a writing-reading control circuit.

FIG. 5 shows a specific example of construction of the writing-reading control circuit 7.

The control circuit 7 comprises a writing address counter 13 and a reading address counter 14 to both of which a clock signal Q (for example, about 10.74 MHz in frequency) is fed from a common signal generator, a selector 15 which feeds both the outputs of the two counters 13, 14 to the address input terminal of the memory circuit 11 after time-division multiplex or feeds one of the outputs selectively to the input terminal, and a timing control circuit 16 for controlling the change-over of the selector 15.

The writing address counter 13 counts clock signal pulses Q while being reset with a rest signal P to produce a writing address signal W with a specified period T (e.g. 262H). The reading address counter 14 counts clock signal pulses Q while being self-reset through overflow to generate a reading address signal R with the same period as the specified period T.

Figure 7A:
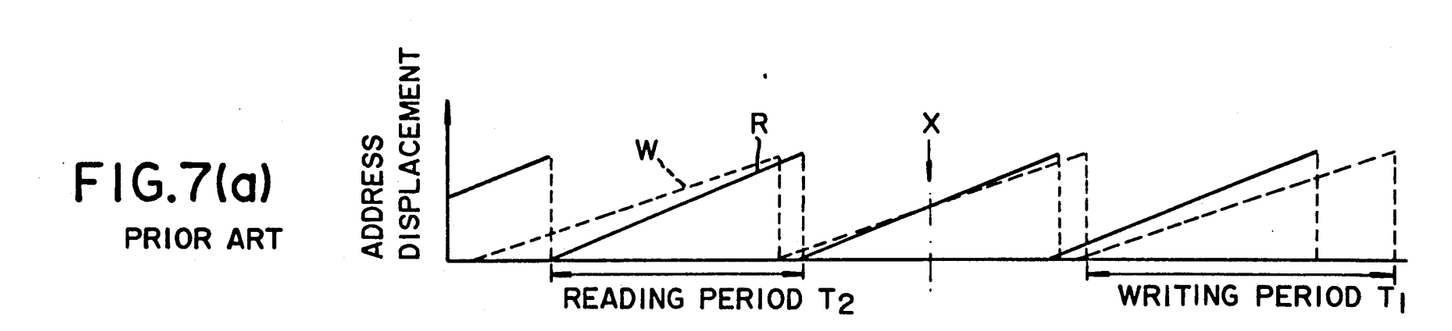

Incidentally, conventional video disc players are equipped with a writing address counter and a reading address counter which are operated by separate clocks, with the result that the writing period $T_1$ and reading period $T_2$ for the memory are not in strict agreement. For example, when the reading period $T_2$ is shorter than the writing period $T_1$ as shown in FIG. 7 (a), a writing address W intersects a reading address R at time X shown, such that writing in the memory thereafter fails to precede reading from the memory.

Figure 7B:
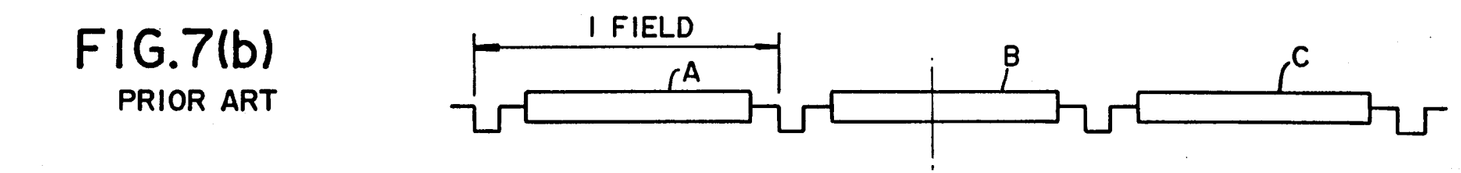
Figure 7C:
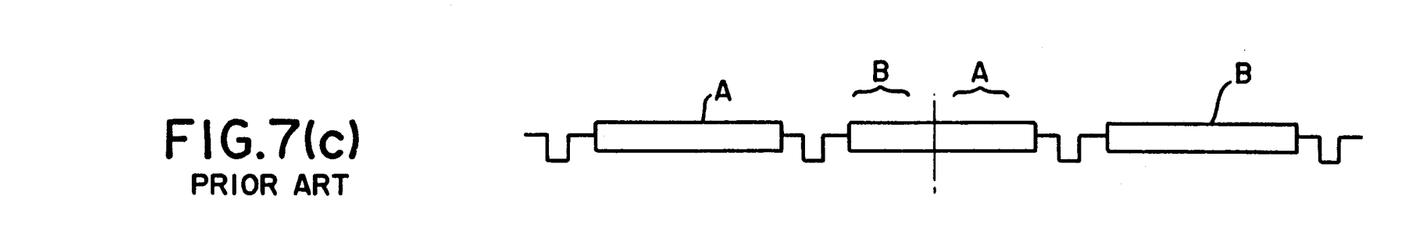

In the illustrated case, the writing of video signal A for one field period shown in FIG. 7 (b) precedes reading, but with respect to video signal B, reading precedes the writing of the latter half portion thereof beyond the time X, with the result that the video signal A for the preceding field is read out as shown in FIG. 7 (c). Accordingly, when the video signal B of FIG. 7 (b) is written in the memory as a still picture signal when the usual reproduction mode is changed to the still reproduction mode, the image is disturbed temporarily when the video signal is read out of the memory.

However, with the writing-reading control circuit 7 of the invention shown in FIG. 5, both the address counters 13, 14 operate based on the common clock signal Q even if video signals are written in and read out of the memory circuit 11 at the same time. This obviates the likelihood that the writing address signal W and the reading address signal R will intersect each other on the time axis, consequently making the mode changeable without any image disturbance.

FIG. 6 shows the operation of the video disc player of FIG. 5 for slow reproduction.

For signal writing, the memory circuit 11 is given a writing instruction signal shown in FIG. 6 (d) (reset signal P to the writing address counter) and also the writing address signal W with the period T shown in FIG. 6 (a), and video signals Va, Vb, ... for one field period shown in FIG. 6 (b) are written in the field memory with a period S (S=3T).

Figure 6A:
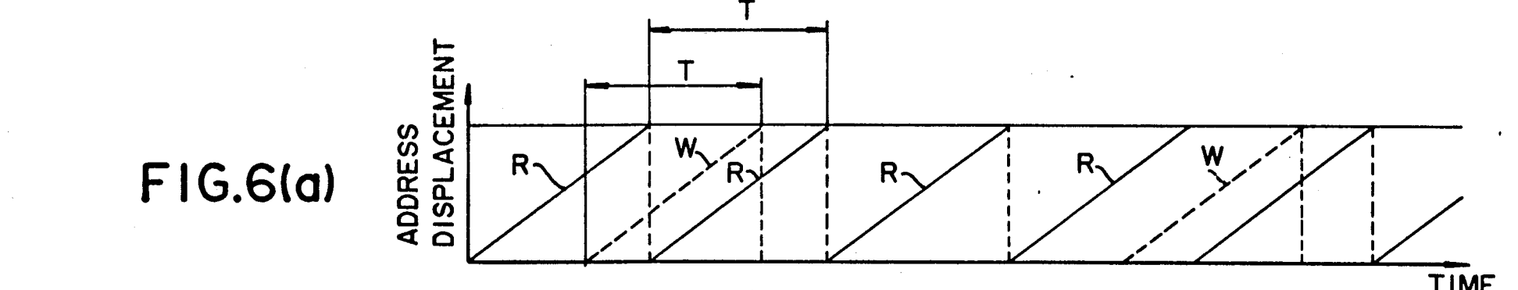
Figure 6B:
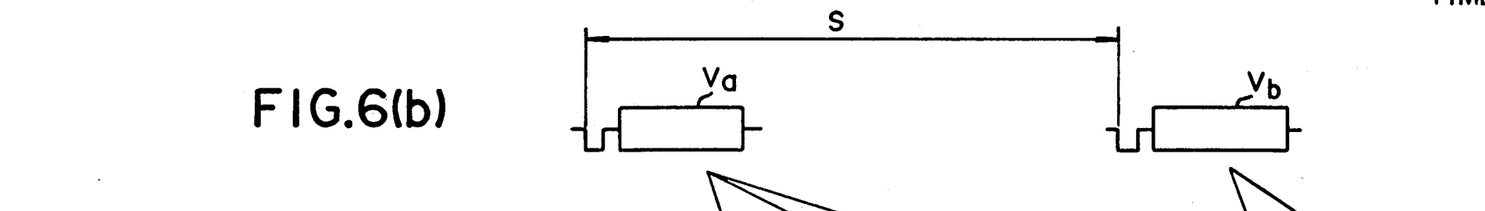
Figure 6C:
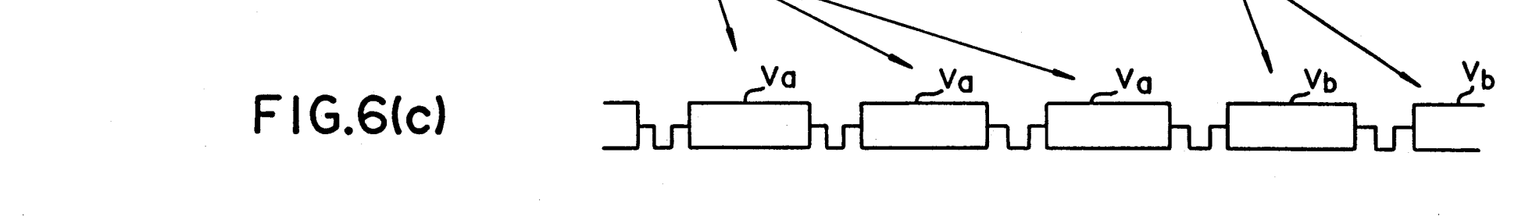
Figure 6D:
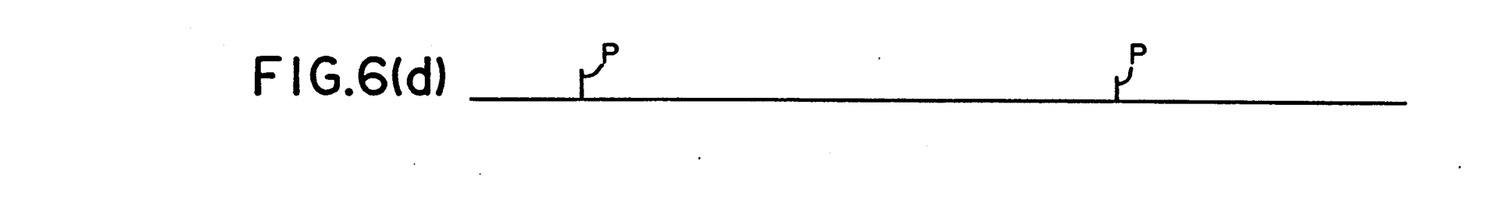

Further as seen in FIG. (c), the video signals are repeatedly read out of the field memory with the period T in accordance with the reading address signal R with the period T to reproduce images in the slow mode with the read-out video signals Va, Va, Va, Vb, Vb, ...

In this case, the writing address signal W and the reading address signal R do not intersect with each other on the time axis as seen in FIG. 6 (a), so that no disturbance occurs in the reproduced images.

The construction of the present apparatus is not limited to the foregoing embodiment but can be modified variously by one skilled in the art without departing from the scope of the invention as defined in the appended claims.

For example, the present invention can of course be applied to video tape recorders. In this case, composite video signals prepared from the output signals of a magnetic head are fed to the memory circuit 11 of FIG. 1.

While the invention has been particularly shown and described in reference to preferred embodiments thereof, it will be understood by those skilled in the art that changes in form and details may be made therein without departing from the spirit and scope of the invention.

What is claimed is:

1. An apparatus for reproducing video signals, comprising:

signal reading means for reproducing video signals recorded in a signal recording medium;

a field memory means for receiving and writing thereinto substantially one field of video signals reproduced by said signal reading means at a constant video signal writing period;

a circuit means for controlling writing in said field memory means and for controlling reading out therefrom at a constant video signal writing-reading period, wherein said video signal writing-reading period for said field memory means is set to a value which is a color subcarrier period multiplied by an integer, said writing-reading set period value also being a horizontal synchronizing period defined by symbol H multiplied by an integer, said value being substantially equivalent to one field period; and means operably coupled to said field memory means for repeatedly controlling reading out said substantially one field of video signals from said field memory means at said constant video signal writing-reading period to therapy attain a special reproduction mode by a series of read out video signals without causing any discontinuation problems at a field junction.

2. An apparatus as defined in claim 1, wherein said video signal writing-reading period for said field memory means is set to 262 H.

3. An apparatus as defined in claim 1, wherein said video signal writing-reading period for said field memory means is set to 264 H.

4. An apparatus as defined in claim 1, wherein said writing-reading control circuit means comprises a writing address counter means and a reading address counter means for counting clock signal pulses from a common clock signal source to thereby produce a writing address signal and a reading address signal respectively, and wherein said writing address signal and the reading address signal are fed to a memory circuit having said field memory means.

5. An apparatus as defined in claim 1, wherein said signal recording medium is an optical disc, and said signal reading means is an optical pickup device.

6. An apparatus as defined in claim 1, wherein said signal recording medium is a magnetic tape, and said signal reading means is a magnetic head device.

7. An apparatus as defined in claim 1, further comprising change-over switch means for switching over between ordinary reproduction and special reproduction, said change-over switch means having two input terminals, one input terminal being connected to an output terminal of said signal reading means and the other input terminal being connected to an output terminal of said field memory means.

* * * * *